United States Patent Office 3,407,163
Patented Oct. 22, 1968

3,407,163
POLYMERIC COMPOSITIONS AND METHOD
OF PREPARING SAME
Marvin A. McCall and James E. Guillet, Kingsport,
Tenn., assignors to Eastman Kodak Company, Rochester, N.Y., a corporation of New Jersey
No Drawing. Continuation of application Ser. No.
296,912, July 23, 1963. This application Sept. 11,
1967, Ser. No. 667,007
13 Claims. (Cl. 260—28.5)

ABSTRACT OF THE DISCLOSURE

Method for preparing a polymeric composition comprising mixing a normally solid unsaturated polymer with a naturally occurring hydrocarbon wax and degrading the mixture at a temperature of about 290° C. to about 450° C. for at least one minute.

---

This application is a continuation of Ser. No. 296,912, filed July 23, 1963, now abandoned.

This invention relates to polymeric compositions exhibiting improved physical properties. More particularly, this invention relates to compositions prepared from blends of normally solid polymers of ethylenically unsaturated hydrocarbons. In a specific aspect, this invention relates to novel polymeric compositions prepared by the thermal degradation of blends of solid polymers of ethylenically unsaturated hydrocarbons with naturally occurring waxes.

Solid polymers of ethylenically unsaturated hydrocarbons, for example, polyethylene, have been described extensively in the literature and have been produced commercially in a variety of different types having distinct physical properties. These polymers have found many uses in diverse fields due to these distinct physical properties. However, in many cases, specifically improved properties or properties covering a wider range are needed and the solid polymers of ethylenically unsaturated hydrocarbons are lacking in one or more of the necessary properties. Many suggestions have been made for improving specific properties or the combination of properties exhibited by a particular solid polymer of an ethylenically unsaturated hydrocarbon.

One of the suggestions for improving the properties of solid polymers of ethylenicaly unsaturated polymers involves blending them with naturally occurring waxes. Naturally occurring waxes such as paraffin waxes and microcrystalline waxes have been employed extensively for this purpose. While such wax additives have been found to have beneficial results, they are not completely satisfactory. Thus, in preparing a composition of a normally solid polymer of an ethylenically unsaturated hydrocarbon, such as polyethylene with a paraffin wax, it is generally necessary to heat the composition to an elevated temperature. However, when the composition is permitted to cool, the components of the blend have a tendency to separate and settle out of the solution. This is particularly undesirable since the resulting compositions are no longer homogeneous and cannot always be employed for the purpose for which they were blended.

It is obvious, therefore, that the state of the art will be greatly enhanced by providing polymer compositions from normally solid polymers of ethylenically unsaturated hydrocarbons and naturally occurring waxes which compositions are not subject to the above deficiencies. Likewise, a process for the preparation of such polymeric compositions would represent a significant advance in the art.

It is accordingly an object of this invention to provide novel polymeric compositions exhibiting improved physical properties.

Another object of this invention is to provide polymeric compositions from solid polymers of ethylenically unsaturated hydrocarbons and naturally occurring waxes which compositions exhibit improved physical properties, particularly compatibility with other materials such as waxes, moisture vapor impermeability and heat-sealing.

Still another object of this invention is to provide a method for the preparation of such polymeric compositions.

Further objects and advantages of this invention will be apparent to those skilled in the art from an examination of the examples and claims that follow.

In accordance with this invention, it has been found that blends of normally solid polymers of ethylenically unsaturated hydrocarbons with naturally occurring waxes can be improved by controlled degradation, as hereinafter described. It has also been found that novel polymeric compositions exhibiting a wide range in physical properties are obtained when these blends are degraded as described hereinafter.

It is known that polymeric materials can be degraded thermally or by other means into lower molecular weight materials. Most polymers degrade into these lower molecular weight materials by one or two, or a combination of, two mechanisms. By one mechanism, the polymer tends to split off monomeric units from the larger polymer molecule, while by the other, the polymer tends to break into large fragments containing a number of monomer units. In the practice of our invention, the course of polymer degradation is greatly altered and, instead of obtaining degradation products characteristic of the individual components in the starting blend, there are obtained novel polymeric compositions exhibiting a wide range of properties. It has also been found that, in addition to a change in characteristic degradation of the components in the blend, there is a significant change in the degradation rate of the solid polymer of the ethylenicaly unsaturated hydrocarbon, frequently being much slower than degradation carried out in the absence of naturally occurring wax.

This invention also provides a method for overcoming several of the significant deficiencies of the high molecular weight solid polymers of ethylenically unsaturated hydrocarbons. Thus, in many applications high molecular weight, normally solid polymers of ethylenically unsaturated hydrocarbons exhibit a number of undesirable properties which limit their use, including, for example, poor adhesion to various substrates, poor compatibility with many resins, waxes, oils, and additives used in coating operations, and a high melt viscosity which leads to considerable difficulties in paper coating applications. In contrast, polymeric compositions can be prepared in the practice of this invention which compositions exhibit improved compatibility with waxes used in the coating industry, improved heat-sealing properties in wax formulations, improved adhesion to paper and good clarity. Such properties cannot be obtained by extrusion or processing techniques now employed in the art with these blends. In addition, the compatibility of the novel polymeric compositions prepared according to this invention are generally significantly increased in paraffin, oils, resins, soaps, and the like. Hence, the cloud point, which is a measure of compatibility of the novel polymeric compositions of this invention in paraffin, is considerably lower than that obtained with a simple mechanical mixture of the same components used in the preparation of these novel polymeric compositions.

In practicing this invention a blend comprising about 5 to about 95%, preferably about 50 to about 90%, by weight, of a solid polymer of an ethylenically unsaturated hydrocarbon and about 95 to about 5%, preferably about 50 to about 10%, by weight, of a naturally occurring wax is degraded for a period of about one minute to several hours to form novel polymeric compositions. This degradation is carried out under conditions such that the molecular weight of the normally solid ethylenically unsaturated hydrocarbon polymer, if treated in the absence of the naturally occurring wax, would be decreased at least ten percent. This degradation can be accomplished by any suitable means although thermal means are preferred. When modification is employed the polymer-wax mixture is degraded, by heating, at a temperature in the range from about 290° to about 450° C. for at least one minute. At these temperatures, the desired degradation takes place and novel polymeric compositions exhibiting an improved combination of properties can be obtained. If, however, lower temperatures are employed, the degradation does not take place and the desired results are not achieved, as shown by Example 9 which follows.

As already indicated, polymeric compositions exhibiting a very desirable combination of properties can be obtained by degrading blends of solid polymers of ethylenically unsaturated hydrocarbons with naturally occurring waxes. It is preferable to effect this degradation by thermal means in the absence of air. This can be accomplished by carrying out the treatment in an autoclave, in vacuum, or in an inert gas such as nitrogen or the like, in bulk, or in the presence of a suitable diluent such as hexane, mineral spirits, benzene, xylene or the like at a temperature in the range of about 290° to about 450° C., preferably about 300° to about 400° C. If desired, hydrogen can be introduced during the degradation in order to further modify the properties of the resulting polymeric composition. Generally, such a modification will decrease the unsaturation and melting point of the resulting polymeric composition.

The time required for the degradation of the blends disclosed herein will vary from several minutes to several hours, depending upon such variable factors as the molecular weights of the components of the blend, the desired characteristics of the polymeric composition formed, and similar variable factors. When heat, rather than mechanical means of degradation is employed, the molecular weight of the product is controlled by variation in the temperature or time of heating, higher temperature leading to lower molecular weight products. It is obvious, therefore, that the time required to effect the desired degree of degradation in a specific situation will depend upon the correlation of several variable factors, including those specified above. However, it has been found that a satisfactory degree of degradation will take place in a period of time of about one minute to about four hours, although in certain circumstances, more than four hours may be necessary.

The novel polymeric compositions of this invention can be readily prepared by heating in any desired manner with conventional equipment and the preparation is adapted for either batch or continuous operation. In a continuous process it is desirable to extrude the polymer-wax mixture in an extruder into a heated zone where it is maintained at the desired temperature for periods of from at least one minute to several hours in order to achieve the desired degree of modification. It is also possible to carry out the degradation by heating in a flowing stream reactor such as a tubular reactor or the heating can be effected in an inert hydrocarbon solvent, either batchwise or in a continuous flowing stream process. The preferred method of practicing this invention involves the thermal treatment at a temperature in the range of about 290° to about 450° C. However, other methods of degradation, e.g., mechanical degradation or the application of high shear to a molten mixture, can be employed.

As already indicated, the blends employed in practicing this invention can contain from about 5 to about 95%, by weight, of the solid polymer of the ethylenically unsaturated hydrocarbon and about 95 to about 5%, by weight, of a naturally occurring wax. Since any combination of the components within the aforesaid ranges can be employed, there becomes available to the art a process which offers broad possibilities for modification of the properties of polymer-wax blends as well as for the modification of the properties of the polymer components of such blends. Thus, such a process allows the polymer-wax blends to be "tailored" for many new and specific uses that were not possible using the polymer alone or the polymer-wax blends alone. This becomes readily apparent from the fact that the properties of the novel polymeric compositions of this invention are different from and superior to those obtained when a polymer of an ethylenically unsaturated hydrocarbon is degraded to the same degree in the absence of the wax. The properties of these novel compositions are also different from and superior to those of mechanical mixtures of polymers of $\alpha$-olefinic hydrocarbon and naturally occurring waxes which have been degraded to the same degree. By the practice of this invention, therefore, many properties of solid polymers of ethylenically unsaturated polymerizable hydrocarbons as well as those of the naturally occurring waxes, e.g., paraffin and microcrystalline, such as hardness and softening point may be either increased or decreased simply by a judicous choice of the components of the blend which is subjected to degradation.

The solid polymers of ethylenically unsaturated hydrocarbons which can be employed in practicing this invention include homo and copolymers of polymerizable hydrocarbons containing at least one —CH═C< or more particularly, a $CH_2$═C< group. These solid polymers can be used alone or in admixture and are formed from monomers which can be represented by the formula $CH_2$═CHR where R is hydrogen or a hydrocarbon radical, preferably aliphatic or aromatic, containing up to 20 carbon atoms. The most preferred hydrocarbon radicals are alkyl radicals containing 1–8 carbon atoms. Although any of the aforementioned polymers can be employed in the practice of this invention, it is preferred that the polymer be a hydrocarbon polymer of one of the polymerizable aliphatic $\alpha$-monoolefins containing 2–10 carbon atoms, preferably 2–6 carbon atoms. The preferred copolymers employed in the practice of this invention are copolymers containing at least 50%, by weight, and more preferably 80%, by weight, of one of the aliphatic $\alpha$-monoolefins containing 2–10 carbon atoms. The solid polymers employed are often crystalline and can be formed by the polymerization of any of the aforementioned monomers as exemplified by ethylene, propylene, butene, 3-methyl-1-butene, pentene, decene, styrene, vinyl cyclohexane, hexene, heptene, octene, dodecene, octadecene, eicosene, 4-methyl-1-pentene, 4-methyl-1-hexene, 5 - methyl - 1 - hexene, 4,4-dimethyl-1-pentene, $\alpha$-methylstyrene, allylbenzene, allylcyclohexane, allylcyclopentane, and the like.

The normally solid polymers of ethylenically unsaturated hydrocarbons employed in the practice of this invention are quite numerous and include a wide variety of polymers well known in the art. In general, these polymers are characterized by a molecular weight of at least 10,000 and a density in the range of about 0.8 to about 1.8 (ASTM 1505–57T). The ethylene polymers employed in the blends used as starting materials in the practice of this invention are particularly effective and include low-density as well as high-density linear polyethylene. These ethylene polymers generally have a density of at least 0.90 and more preferably a density in the range of about 0.91 to about 0.97. The solid polymers of propylene also give good results when employed in the practice of this invention. The density of these polymers is generally in the range of about 0.88 to less than 0.93. The ethylene-propylene copolymers are also particularly good starting materials. The molecular weights of the solid polymers employed in this invention can be readily determined from the inherent viscosity of the polymer in Tetralin at 145° C. using the Staudinger equation. These inherent viscosities of the polymers in Tetralin at 145° C. are generally at least 0.7.

The naturally occurring waxes employed in the practice of this invention include any of the well known animal, vegetable or mineral waxes. These waxes are solid materials and can be divided into several well established groups, including paraffin waxes (normally obtained from petroleum oil lubricating distillates), microcrystalline wax (usually obtained from residual lubricating oil fractions), soft waxes which include isoparaffinic and napthenic waxes usually obtained during the deoiling of paraffin waxes and the so-called high melting point waxes normally obtained by fractionating microcrystalline wax. These waxes are essentially hydrocarbon in nature although they may contain small amounts of esters, lactones, etc. The naturally occurring waxes, which have been found to be most desirable in the practice of this invention are paraffin wax, microcrystalline wax, ozokerite, candelilla, although other naturally occurring waxes such as esparto, ceresine Utah wax beeswax, Chinese insect wax, montan and carnauba can be employed. These waxes exhibit widely varying properties although in general, they have a specific gravity in the range of about 0.90 to 0.94 and a melting point in the range of about 60° to about 85° C.

The characteristics of the novel polymeric compositions obtained by the practice of this invention can be varied over a wide range and will, to a large extent, be determined by the conditions of treatment as well as the particular starting materials employed. In general, however, the products obtained will range from wax-like materials with molecular weights as low as 500 to rigid plastics having molecular weights of 50,000 or higher. Accordingly, the inherent viscosities will range from about 0.1 or less to 3 or more in Tetralin at 145° C. In general, the materials having an inherent viscosity in Tetralin at 145° C. in the range of about .2 to about .5 are most useful in coatings although higher or lower molecular weight materials can also be used for this purpose.

The preparation of typical polymeric compositions embodied in this invention is illustrated by the following examples, but it should be understood that these examples are merely illustrative and not intended to limit the scope of the invention unless otherwise specified.

EXAMPLE 1

The physical properties, particularly compatibility of a polymer-wax blend, can be improved by degradation. To illustrate, a blend comprising 150 grams of polypropylene having an inherent viscosity in Tetralin at 145° C. of 3.1 and 50 grams of paraffin wax having a melting point of 130° F. is degraded by heating in an autoclave under nitrogen with stirring at 370°–385° C. for one hour. The cloud point of the resulting polymeric composition in paraffin is 94° C. In contrast, the same polypropylene degraded in the absence of paraffin wax at this temperature and time, has a cloud point in paraffin at 103° C. In addition, a comparable polypropylene-paraffin wax blend which is not degraded has a similarly high cloud point. Thus, the practice of this invention provides a novel product having improved compatibility in comparison to polypropylene which is degraded in the absence of paraffin or a polypropylene-paraffin wax blend which is not degraded. The polymeric composition prepared according to this procedure has an inherent viscosity in Tetralin at 145° C. of 0.3 and is readily flowable to form shaped articles and coatings. Similar results are obtained when the polypropylene in the above procedure is substituted by copolymers of ethylene with propylene, propylene with butene, or 4-methyl-1-pentene with 3-methyl-1-butene.

EXAMPLE 2

A blend of 150 grams of polypropylene having an inherent viscosity in Tetralin at 145° C. of 3.1 and 50 grams of microcrystalline wax having a melting point of 190°–195° F. is degraded by heating in an autoclave under nitrogen at 380° C. for one hour with stirring.

The resulting polymeric product has a melt viscosity of 1500 cp. at 190° C. and is more compatible with paraffin than a mechanical mixture of a degraded polypropylene and microcrystalline wax, the degree of degradation being the same as the above blend. Thus, the cloud point of the polymeric composition obtained by the above procedure is 95° C. in paraffin as compared with 108° C. for the mixture of the separately degraded polypropylene and microcrystalline wax.

EXAMPLE 3

A blend of 150 grams of polyethylene having a density of 0.918 and a melt index of 1.8 and 50 grams of paraffin wax having a melting point of 130° F. is prepared by melting and vigorous stirring. The blend is degraded by heating in a three neck flask under nitrogen at 275°–325° C. for two hours with stirring. The resulting polymeric composition has a cloud point of 65° C. in paraffin. In contrast, polyethylene which is thermally degraded under the same conditions in the absence of paraffin has a cloud point of 81° C. in paraffin.

As previously indicated, degradation by thermal treatment is preferred in practicing this invention. However, when the above blend is degraded by the application of high pressure shear to the molten blend similar results are achieved. Such high pressure shear degradation can be readily accomplished by extruding the molten blend under a pressure of about 20,000–60,000 p.s.i. and a temperature of about 100°–300° C. through a suitable channel, for example one which is at least 2 inches long having a cross-sectional dimension up to about 0.03 inch.

EXAMPLE 4

Polyethylene (150 g., density 0.962, melt index 0.7) is blended with 50 g. of microcrystalline wax (M.P. 190–195° F.) by melting and stirring. The resulting blend is then thermally modified by heating in a three-necked flask under nitrogen with stirring at 350 °C. for one hour. The resulting novel polymeric product is much more compatible with paraffin than a mechanical mixture of de-degraded polypropylene and microcrystalline wax. Thus, the cloud point of the novel polymeric composition is 83° C. as compared with 95° C. for a control using the mechanical mixture of proplyene and microcrystalline wax.

The novel polymeric composition prepared by this procedure is useful as a coating material for paper and cardboard. When paper on milk carton stock is dipped coated in this composition, it is found that very thin coatings can be obtained (1 to 3 mils) which coatings are more impermeable to water by the standard T.A.P.P.I. test in comparison to paraffin alone.

When the novel thermally prepared composition of this example is used as a modifier for paraffin, it is found that less paraffin can be used to obtain the same or better moisture vapor impermeability. Thus, when 30%, by weight, of this novel thermally prepared composition is blended with paraffin and the blend is used to dip-coat milk bottle stock, a pick up of only 2% is needed at 100° C. to give a film thickness of approximately 2 mils per side. This film exhibits the same or better moisture vapor transmission as a similarly coated stock with 5% pick up of paraffin alone.

EXAMPLE 5

Polybutene (80 g., inherent viscosity in Tetralin at 145° C. of 2.3) is blended with ozokerite (20 g., M.P. 73° C.) and heated in an autoclave with 100 ml. heptane solvent under nitrogen at 300° C. for two hours with stirring. After removing the heptane, the product has an inherent viscosity of 0.27.

When the resulting thermally prepared product (70 parts, by weight) is blended with paraffin wax (30 parts, by weight), there is obtained a blend with improved toughness, the button impact of this formulation being 3.2. By comparison, a button impact of only 1.8 is obtained for a mixture of 70 parts, by weight, of degraded polybutene (inherent viscosity 0.27) and 30 parts, by weight, of paraffin. The button impact of paraffin alone is 0.7 on this same scale.

In like manner, polyoctene blended in a 50/50 weight mixture with candelilla wax (M.P. 70° C.) is thermally treated at 350° C. A blend of this product with paraffin or microcrystalline wax results in improved toughness over a mechanical mixture that has not been so degraded.

EXAMPLE 6

Polybutene (50 g., inherent viscosity in Tetralin of 2.3) is blended with paraffin wax (50 g., M.P. 130° F.) and placed in an autoclave with 100 ml. of heptane solvent and heated to 375° C. for one hour. After removing the solvent, the resulting product has an inherent viscosity in Tetralin at 145° C. of 0.25.

When this novel product (30 parts, by weight) is blended with paraffin (70 parts, by weight) there is obtained a blend having improved toughness. The button impact of this formulation is 2.9. By comparison, a button impact of only 1.8 is obtained for a comparable composition made by thermally degrading poly-1-butene to an inherent viscosity in Tetralin at 145° C. of 0.27 and then blending with paraffin in the same 30/70 ratio. The button impact of paraffin alone is 0.7 on the same scale.

EXAMPLE 7

Polystyrene (50 g.) is mixed with 50 g. of paraffin wax (M.P. 180° F.) and heated in an autoclave with 150 cc. of heptane solvent under nitrogen at 350° C. for one hour with stirring. After removing the heptane solvent, the product is tough and hard. It can be molded into shaped articles and has a penetration hardness of 0.10 mm. with 100 g./5 sec./77° F.

This thermally prepared material can be blended with paraffin to increase the hardness of the paraffin. For example, when 5% of this novel thermally prepared composition is blended with 95% paraffin, the hardness of the resulting blend is 1.5 mm./5 sec./77° F. while paraffin alone has a penetration hardness of only 2.2 mm./5 sec./77° F. (ASTM D5-52, 100 g. scale).

EXAMPLE 8

Poly(4-methyl-1-pentene) (50 g., inherent viscosity in Tetralin at 145° C.) of 1.2 is blended with 50 g. of paraffin wax and heated in an autoclave with 150 cc. of heptane as solvent under nitrogen at 375° C. for thirty minutes with stirring. After removing the heptane solvent, the product is tough and hard and can be molded into shaped articles. It has a penetration hardness of 10.0 mm. with 100 g./5 sec./77° F.

This thermally prepared material can be blended with paraffin to up-grade or harden the paraffin to make it more useful in coatings for paper and cardboard. For example, when 5 g. of this novel thermally prepared composition is blended with 95 g. of paraffin, the hardness of the resulting blend is 1.6 mm./5 sec./77° F. while the paraffin alone has a penetration hardness of only 2.2 mm./5 sec./77° F.

In similar manner, poly(4-vinyl-1-cyclohexene) can be used in the above procedure in place of the polybutene to make a novel polymeric composition which can also be molded into shaped articles or used in small quantities, for example, 5 to 10%, to up-grade paraffin or microcrystalline wax to increase their penetration hardness.

EXAMPLE 9

As already indicated, the desired results described herein are not obtained when a polymer-wax blend is heated to the molten state but below the temperature required for degradation. To illustrate, polyethylene (150 g., density 0.962 and melt index of 0.7) is melt blended with microcrystalline wax 50 g., M.P. 190°–195° F.). The resulting molten blend is heated at 204° C. for one hour under nitrogen with stirring in a three-neck flask.

The resulting product is no more compatible with paraffin than a mechanical mixture of polyethylene and microcrystalline wax. Thus, the cloud point of this product is the same as that obtained with a simple physical mixture of the two components, i.e., 95° C. In contrast, with a polymeric composition prepared by thermal degradation, as in Example 4, the cloud point in paraffin is reduced to 83° C. which shows the significant improvement in compatibility obtained by the practice of this invention.

Thus, by the practice of this invention it is possible to improve one or more properties of solid polymers of ethylenically unsaturated hydrocarbons and blends of these polymers with naturally occurring waxes. The novel polymeric compositions prepared according to this invention are useful as additives for paraffin, microcrystalline and other waxes. When employed in such compositions they impart improved hardness and toughness and exhibit improved compatibility and clarity. The novel polymeric compositions of this invention can be blended with polyolefins such as polyethylene, polypropylene, rubbery copolymers of ethylene with propylene, butyl rubber, waxes, and the like. The low molecular weight polymeric compositions prepared by the practice of the invention are particularly useful in coating paper to produce a coated material exhibiting improved heat sealing properties. Hence, these novel polymeric compositions are useful as substitutes for more expensive vegetable and mineral waxes, as additives to other waxes, polymers and greases, as coating materials for various substrates including paper, cloth, wood, metal, food and the like.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. Method for preparing a polymeric composition comprising the steps of: (a) mixing about 95 percent to about 5 percent, by weight, of a naturally occurring hydrocarbon wax with about 5 percent to about 95 percent, by weight, of a normally solid polymer of a compound having the formula:

$$CH_2=CH-R$$

where R is a member selected from the group consisting of hydrogen and hydrocarbon radicals containing up to 20 carbon atoms; and (b) degrading the mixture of (a) at a temperature of about 290° C. to about 450° C. for at least one hour in an inert atmosphere.

2. Method for preparing a polymeric composition as defined in claim 1 wherein the mixture of (a) is degraded at a temperature of about 300° C. to about 400° C. for a period of about one hour to about four hours.

3. Method for preparing a polymeric composition as defined in claim 1 wherein R is an alkyl radical containing 1 to 8 carbon atoms.

4. The method of claim 1 in which the solid polymer is polyethylene.

5. The method of claim 1 in which the solid polymer is polypropylene.

6. The method of claim 1 in which the solid polymer is polybutene.

7. The method of claim 1 in which the solid polymer is polyethylene and the naturally occurring wax is paraffin wax.

8. The method of claim 1 in which the solid polymer is polyethylene and the naturally occurring wax is microcrystalline wax.

9. The method of claim 1 in which the solid polymer is polypropylene and the naturally occurring wax is paraffin wax.

10. The method of claim 1 in which the solid polymer is polypropylene and the naturally occurring wax is microcrystalline wax.

11. The method which comprises degrading, by heating, at a temperature in the range of about 370° to about 385° C. for about one hour in an inert atmosphere, a blend comprising (1) about 75%, by weight, of polypropylene having an inherent viscosity in Tetralin at 145° C. of about 3.1, and (2) about 25%, by weight, of paraffin wax having a melting point of about 130° F.

12. The method which comprises degrading, by heating at a temperature of about 380° C. for about one hour in an inert atmosphere, a blend comprising (1) about 75%, by weight, of polypropylene having an inherent viscosity in Tetralin at 145° C. of about 3.1, and (2) about 25%, by weight, of microcrystalline wax having a melting point in the range of about 190° to about 195° F.

13. The product obtained by the process of claim 1.

References Cited

UNITED STATES PATENTS

| | | |
|---|---|---|
| 2,560,773 | 7/1951 | Lovell. |
| 2,830,962 | 4/1958 | Potter et al. |
| 3,144,436 | 8/1964 | Greene et al. |

MORRIS LIEBMAN, *Primary Examiner.*

H. S. KAPLAN, *Assistant Examiner.*